United States Patent
Löffler et al.

(10) Patent No.: US 9,272,726 B2
(45) Date of Patent: Mar. 1, 2016

(54) ADJUSTABLE SAFETY STEERING COLUMN

(75) Inventors: Linda Löffler, Pressig (DE); Sebastian Heinze, Sachsenbrunn (DE); Christian Saxstetter, Dörfles-Esbach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 269 days.

(21) Appl. No.: 13/516,260

(22) PCT Filed: Dec. 14, 2010

(86) PCT No.: PCT/EP2010/007613
§ 371 (c)(1),
(2), (4) Date: Aug. 14, 2012

(87) PCT Pub. No.: WO2011/116808
PCT Pub. Date: Sep. 29, 2011

(65) Prior Publication Data
US 2012/0304798 A1 Dec. 6, 2012

(30) Foreign Application Priority Data

Dec. 16, 2009 (DE) .......................... 10 2009 058 686

(51) Int. Cl.
*B62D 1/18* (2006.01)
*B62D 1/184* (2006.01)
(Continued)

(52) U.S. Cl.
CPC ................ *B62D 1/184* (2013.01); *B62D 1/192* (2013.01); *F16F 1/12* (2013.01)

(58) Field of Classification Search
CPC ............ B62D 1/184; B62D 1/192; F16F 1/12
See application file for complete search history.

(56) References Cited

U.S. PATENT DOCUMENTS 4,678,361 A    7/1987  Steinkamper et al.

FOREIGN PATENT DOCUMENTS

| CN | 1118752 | 3/1996 |
|---|---|---|
| CN | 101380964 | 3/2009 |
| DE | 1605885 | 4/1971 |

(Continued)

OTHER PUBLICATIONS

PCT/EP2010/007613; PCT International Search Report dated Aug. 11, 2011.

(Continued)

*Primary Examiner* — Paul N Dickson
*Assistant Examiner* — Joselynn Y Sliteris
(74) *Attorney, Agent, or Firm* — Renner, Otto, Boisselle & Sklar, LLP (57) ABSTRACT

The invention relates to an adjustable safety steering column for a motor vehicle, comprising at least one clamping device (100) which, for the purpose of fixing the length of the adjustable steering column (10), has a torsion spring (130) which clamps a casing tube (110) for a steering shaft (110) at a position that can be adjusted by way of releasing the torsion spring (130), the casing tube being inserted in the clamping device (100). At least in the vicinity of one end of the torsion spring (130) at least one stop element (141, 142, 143) is arranged, against which the torsion spring (130) strikes during an axial displacement (V) of the casing tube (110) which is directed toward the receiving tube, whereby the coil of the torsion spring (130) assumes an oblique position, which can be limited. An adjustable crash function is thus implemented.

11 Claims, 7 Drawing Sheets

(51) Int. Cl.
*B62D 1/19* (2006.01)
*F16F 1/12* (2006.01)

(56) References Cited

FOREIGN PATENT DOCUMENTS

| | | |
|---|---|---|
| DE | 3438918 | 4/1986 |
| DE | 102008036547 | 2/2010 |
| DE | 102008036548 | 2/2010 |
| JP | 6441465 | 2/1989 |
| JP | 200669524 | 3/2006 |
| JP | 2009202638 | 9/2009 |

OTHER PUBLICATIONS

Official Action for Chinese Application No. 201080057106.5 dated Dec. 4, 2013 and its English translation.
Official Action for Japanese Application No. 2012-543518 dated Oct. 22, 2013 and its English translation.
Decision to Grant for European Application No. 10835274.1 dated Mar. 20, 2014.
Search Report for German Application No. 10 2009 058 686.5 dated Sep. 2, 2010.
PCT/EP2010/007613; PCT International Preliminary Report on Patentability mailed Jun. 28, 2012 and its English translation mailed Jul. 12, 2012.

ADJUSTABLE SAFETY STEERING COLUMN

The invention relates to an adjustable safety steering column and to a clamping device provided therefor for adjusting the steering column. The invention relates in particular to a safety steering column and to a clamping device, which allow easy adjustment of the steering column position, at least in the axial direction, and provide a crash function.

Safety steering columns are known from the prior art, in which at least one clamping device is usually used to adjust the steering column position.

DE 10 2008 036 548 describes a steering column in which both the length and the inclination can be adjusted by means of respective clamping devices. Each clamping device comprises an elastic element, preferably in the form of a torsion spring or wrap spring, which can be expanded by applying a force but is constricted in the normal state, so as to exert a clamping force on a component guided through the torsion spring. The clamping device that is provided for adjusting and fixing the length, for example, has a torsion spring which acts on a receiving tube or casing tube for a steering shaft and clamps the casing tube in the desired position. By expanding the torsion spring, the clamping connection can be released and the positions of the casing tube and of the steering shaft mounted therein, and consequently the length of the steering column, can be easily adjusted. The torsion spring can be expanded by means of a mechanism which is driven by an electric motor. To this end, the electric motor must be activated only to widen the torsion spring, while no activation or energization of the motor is required in the clamped state. Such a clamping device is also provided for adjusting the inclination. Because of the proposed design, a mechanism for adjusting the steering column, which is fast and easy to operate, can be implemented using only two torsion springs or wrap springs, also referred to as leg springs. A crash function is also provided, because in the event of a rear-end collision and the attendant displacement of the casing tube or of the steering shaft, at least the clamping device that is provided for longitudinal fixation would yield and the casing tube or the steering shaft would therefore be able to slide deeper into the receiving mounting. An adjustable steering column having a crash function, which allows a defined, and therefore safe, sliding behavior in the event of a vehicle impact, would be desirable.

The unexamined patent application DE 1 605 885 describes a safety steering column in which a torsion spring or flat spiral spring is provided, which surrounds a steering cover tube or a casing tube for a steering shaft with a friction fit, whereby a displacement, which is decelerated by friction, occurs in the event of the impact. For the normal driving mode, the torsion spring can be expanded by a manually operated mechanism so as to adjust the length of the steering column. In this way, both the locking function and the crash function are substantially defined by the clamping force of the torsion spring, wherein the static friction must be taken into consideration for the locking function and the sliding friction which occurs after the static friction is overcome must be taken into consideration for the crash function. It is possible for the sliding friction to be considerably lower, and therefore the braking action (absorption of impact) that is achieved may be insufficient. This is particularly significant in modern vehicles because these usually also contain an airbag, which is installed in the steering handwheel and activated in the event of impact.

It is therefore the object of the invention to propose an adjustable safety steering column which overcomes the drawbacks of the aforementioned solutions. In particular an adjustable safety steering column is proposed, which has a definable and safe crash function, without compromising the adjustability thereof.

The object is achieved by an adjustable safety steering column having the characteristics of claim 1 and by a clamping device provided therefor having the characteristics of the additional independent claim.

An adjustable safety steering column comprising at least one clamping device is thus proposed which, for the purpose of fixing the length of the adjustable steering column, has a torsion spring which clamps a casing tube for the steering shaft at a position that can be adjusted by releasing the torsion spring, the casing tube being inserted in the clamping device, wherein at least in the vicinity of one end of the torsion spring at least one stop element is arranged, against which the torsion spring strikes during an axial displacement of the casing tube occurring in the insertion direction, or toward the receiving mounting, whereby the coil of the torsion spring assumes an oblique position, which can be limited.

Similarly, a clamping device for fixing the length or inclination of such a steering column is proposed, wherein the clamping device comprises a torsion spring which clamps the casing tube or steering cover tube at a position that can be adjusted by releasing the torsion spring wherein, at least in the vicinity of one end of the torsion spring, at least one stop element is arranged, against which the torsion spring strikes in the event of impact, whereby the coil of the torsion spring assumes an oblique position, which can be limited.

An adjustable safety steering column is thus created, in which an adjusting or clamping function as well as an effective crash safety function can be implemented using fewer components. By causing limitable deflection of the torsion spring(s) in the event of impact, a defined braking action occurs because of the associated oblique position of the coil(s), this action providing a safe and calculable crash function.

A first stop element is preferably arranged at one end of the torsion spring, and a second stop element is preferably arranged at the other end of the torsion spring, each end striking against one of the stop elements as soon as the casing tube undergoes a displacement. As a result, the torsion spring is immediately shifted into an oblique position when a displacement occurs, even under normal circumstances, but in particular in the event of a crash, allowing the static friction, which is substantially defined by the clamping force of the torsion spring in the normal position, to be overcome more easily. The second stop element can be arranged offset from the first stop element in the circumferential direction. This offset is not absolutely required, but may further facilitate the oblique positioning of the coil. In the overall, this makes it easier for the static friction, which is substantially defined by the clamping force of the torsion spring in the normal position, to be overcome, sliding friction then being produced, which is substantially defined by the limitable oblique position or deflection of the coil.

A (third) stop element or limit stop element is preferably arranged at a predeterminable distance from one of the two ends of the torsion spring, this end of the torsion spring striking against this element only if the displacement of the steering shaft has reached or exceeded the predeterminable distance. Thus the deflection only reaches a maximum allowable degree, whereby the friction coefficient is in turn adjusted to exactly the level that is defined by the distance and the maximum deflection that can be established thereby. The friction coefficient in the narrower sense, which is to say the friction coefficient of the material pairing, does not change, however the friction force level that can be adjusted according to the invention changes. The distance preferably ranges between 0 and 20 mm. The positioning of this spaced (third) stop element reduces the maximum possible oblique position of the torsion spring, whereby the break-away force (overcoming of the static friction) and the displacement force (sliding friction) can be adjusted. The larger the distance, and thus the allowable oblique position, the smaller will be the adjusting clamping force.

As an alternative, or in addition, an elongate stop element extending in the circumferential direction may be arranged in the vicinity of one of the two ends of the torsion spring, with the elongate stop element arranged at an angle of inclination which can be adjusted relative to the transverse direction such that, when displacement occurs, this end of the torsion spring is seated against the elongate stop element in an oblique position, which is predetermined by the angle of inclination. An obliquely positioned stop surface is thus achieved for one end of the torsion spring, whereby the defined maximum deflection can in turn be established with great precision. In this context it is advantageous for the angle of inclination to range between 0 and 10 degrees. Moreover, the elongate stop element is preferably designed such that it extends in the circumferential direction in accordance with a predeterminable angle. This angle substantially defines the length or surface area with which the end of the torsion spring is seated against the stop element in the event of a crash and should preferably range between 45 and 120 degrees, but may range between 0 and 360 degrees.

It is also possible to equip the adjustable safety steering column with two or more such clamping devices, wherein a first clamping device is used to fix the length and a second clamping device is used to fix the length or inclination of the adjustable steering column, and wherein each clamping device comprises a torsion spring, in which at least one stop element is arranged at least in the vicinity of one end of the torsion spring, the torsion spring striking against the stop element during a vehicle impact, causing the coil of the torsion spring to assume an oblique position, which can be limited. A multifold or multi-stage crash function can thus be implemented, which acts in the longitudinal direction, for example. It is also possible to implement a multifold crash function acting in the longitudinal direction and in the direction of inclination.

Moreover, the steering column, or the component on which the torsion spring acts, may comprise an opening, for example in the form of a longitudinal slot, which causes a defined material weakening and thus an adjustment of the prevailing clamping force.

These and further advantageous embodiments of the invention will also be apparent from the dependent claims.

The invention will be described hereafter in detail based on exemplary embodiments and with reference to the accompanying drawings, wherein the drawings depict the following schematic representations.

Figure 1:
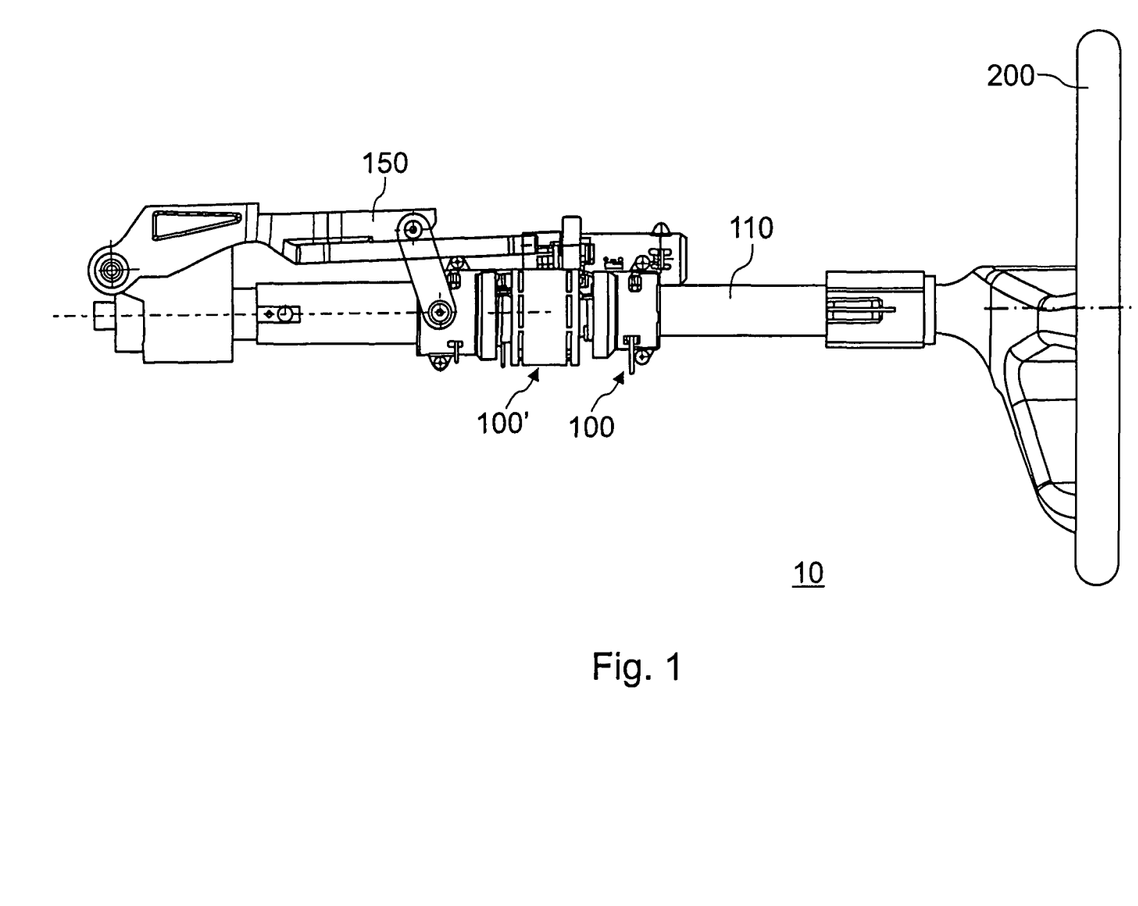
FIG. 1 shows a transverse view of the overall design of a safety steering column according to the invention.

FIG. 1 shows a transverse view of the overall design of a safety steering column 10, which can be adjusted in terms of the length as well as the inclination thereof by means of the clamping devices 100 and 100' described in more detail below, wherein at least one of the clamping devices also produces a crash safety function.

Figure 2:
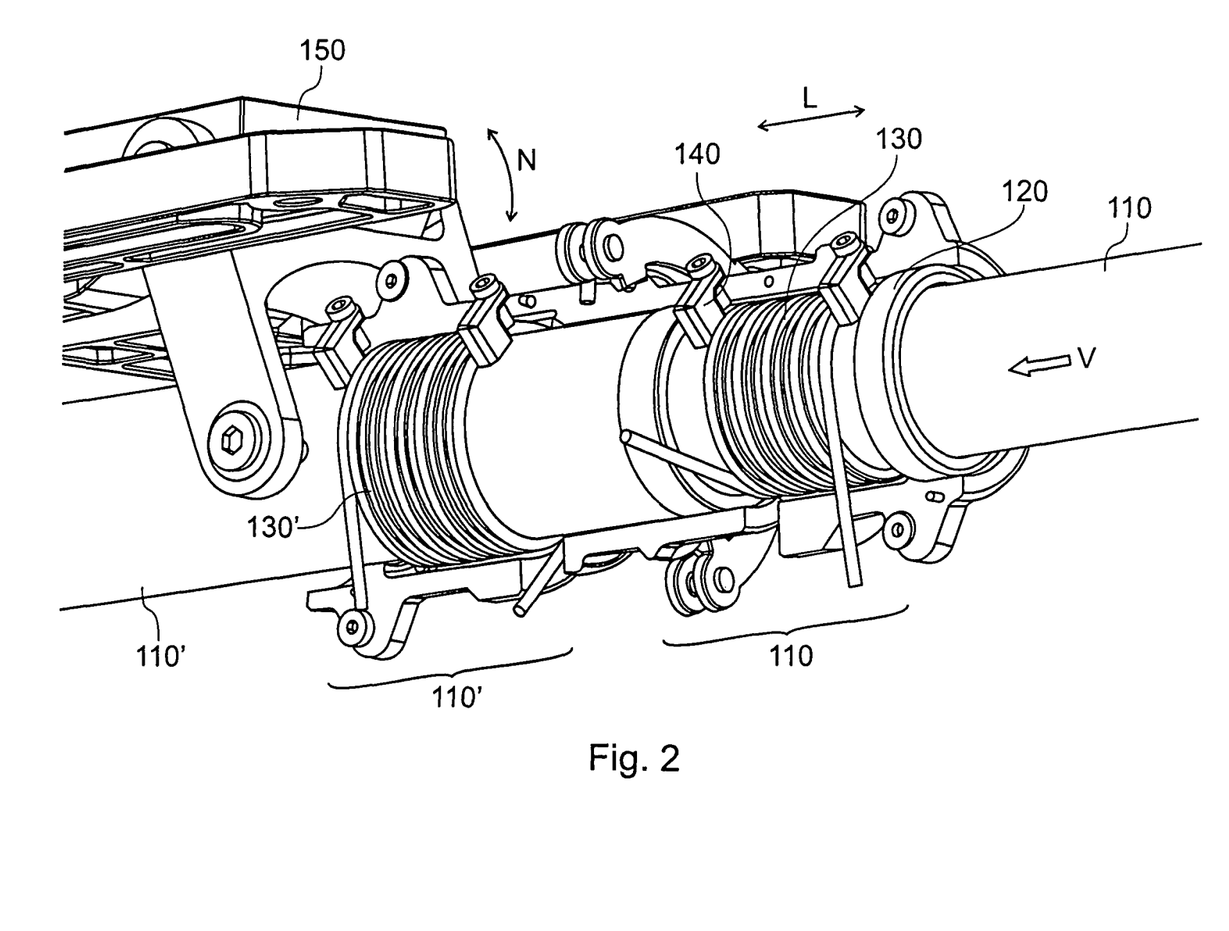
FIG. 2 shows, in more detail, the clamping device according to the invention, which is implemented by means of torsion springs and has the safety function.

The safety steering column 10 shown comprises a steering handwheel 200 or a steering wheel, which is mounted to a steering column or a casing tube 110 for the steering shaft protruding into the clamping device 100. The steering column 10 and the clamping devices 100 and 100' arranged thereon are connected to the body of the vehicle via a lever mechanism 150, wherein the lever mechanism 150 allows the angle of inclination of the steering column 110 to be adjusted in cooperation with the clamping device 100'. The other clamping device 100 implements an adjustment option for the casing tube 110, and thus for the steering column, in the longitudinal direction or axial direction. The crash safety function, which will be described in more detail hereafter, can be implemented on both clamping devices, but is implemented at least on the clamping device 100:

FIG. 2 shows a detailed view of the design of the steering column section that comprises the clamping devices 100 and 100'. The description below references in particular the clamping device 100, in which the casing tube 110 having the steering shaft mounted therein is introduced, and which is designed for longitudinally locking the steering column (longitudinal adjustment L). The other clamping device 100' implements the locking of the inclination of the steering column via the lever mechanism 150 (inclination angle adjustment N).

To this end, each clamping device comprises a torsion spring 130 or 130', wherein the first torsion spring 130 causes clamping of the steering column or of the casing tube 110 for the purpose of adjusting the length, and wherein the second torsion spring 130' causes clamping of a receiving tube 110' and locks the steering column in the direction of inclination by means or the revolute-joint connection to the lever mechanism 150. According to the invention, the torsion springs 130 and 130' are provided at least at one of the ends thereof with at least one stop element, which here is represented by way of example by the stop element 140. Under normal circumstances, the stop elements may be used to guide the respective torsion spring so as to ensure that the torsion spring is in the respectively intended optimal normal axial position. Under the aforementioned normal circumstances, which is to say when the steering column is adjusted, both springs are clamped at the respective positions thereof. Clamping of the casing tube 110, and thus locking in the longitudinal direction, is produced by the torsion or wrap spring 130. A clamping action likewise exists between the other torsion or wrap spring 130' and the receiving tube 110', this action producing the locking in the direction of inclination. This means that, under normal circumstances, both torsion springs exert a locking clamping force at the respective positions.

To adjust the steering column, only the respective torsion spring must be opened, with this preferably being carried out by way of an electric-motor drive. The ends of the torsion springs are acted on by forces that cause an increase of the respective coil diameter and thereby an expansion of the respective torsion spring. This in turn causes the prevailing clamping force to be suspended such that both the length L and the inclination N of the steering column 10 can be adjusted. Once the optimal adjustment position has been found, the electric-motor drive is deactivated and the torsion springs contract again, becoming clamped at the intended positions thereof.

The invention is based on the realization that, in the event of a crash, a considerable axial force occurs in the steering column, and notably in the casing tube or the steering shaft, this force leading to an inwardly directed displacement V, or shortening of the steering column. As soon as the crash force that occurs overcomes the clamping force (static friction) prevailing in the torsion spring 130, the casing tube 110, which is connected to the steering shaft, shifts relative to the clamping device 100 and slides into the receiving mounting 120 or receiving tube 110', which in turn causes the desired yielding of the steering column, and thus constitutes a safety feature.

However, deliberations and experimentation have led to the realization that the clamping forces typically required for locking are quite high and would impair a defined gentle and uniform sliding of the steering column.

The invention is based on the realization that, by adjusting the deflection of the torsion spring 130 in a defined manner, in the event of a crash, uniform shifting of the steering shaft 110, or of other steering column components on which the clamping device directly acts, can be achieved, whereby notably no jerking effects or other impairing effects occur. So as to achieve this deliberate deflection, according to the invention at least one stop element (see 140 in FIG. 2) is to be provided, against which the torsion spring 130 strikes in a defined manner in the event of a crash and which thus becomes deflected. Preferably additional stop elements are provided, which in the event of a crash cause the manner and extent of the deflection (initiating the deflection up to a defined angle of inclination) and thus ultimately establish a sliding force that is below the normal clamping force.

In the event of a crash, the steering column consequently yields and is pushed into the clamping device at a lower force, and the vehicle occupant is thus received as gently as possible during impact with the steering wheel (see steering handwheel 200 in FIG. 1), even if an airbag is used, and in particular the steering column is allowed to yield and penetrate into the vehicle interior without jerking. The invention implements a cost-effective locking and safety function.

Figure 3:
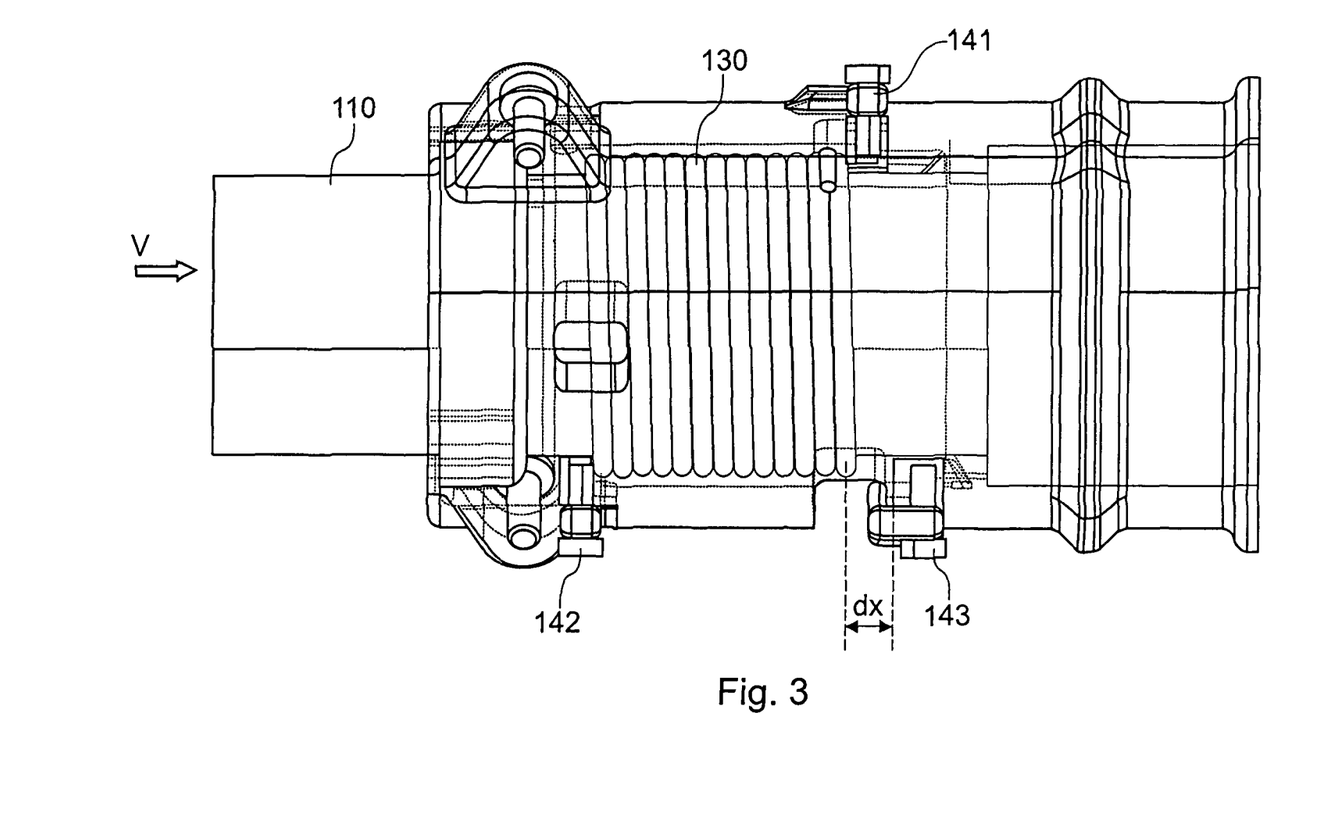
FIG. 3 shows the defined deflection of the torsion spring caused in the event of a crash based on a torsion spring.

FIG. 3 shows, in more detail, a torsion spring 130, on which several stop elements 141, 142 and 143 are arranged as described below, in the vicinity of the ends of the torsion spring:

A first stop element 141 is located at the end of the torsion spring 130 that is oriented toward the receiving tube (here the right side). A second stop element 142, which is arranged offset from the first in the circumferential direction, is located at the other end of the torsion spring 130. This offset between the first stop element 141 and the second stop element 142 can amount to several angular degrees, but should preferably be approximately 180 degrees. In the event of a crash, both stop elements 141 and 142, at the respective contact points, thus work to displace, which is to say compress, the torsion spring 130 inwardly, and the offset of the stop elements causes a deflection of the torsion spring or an oblique position of the coil.

Figure 7:
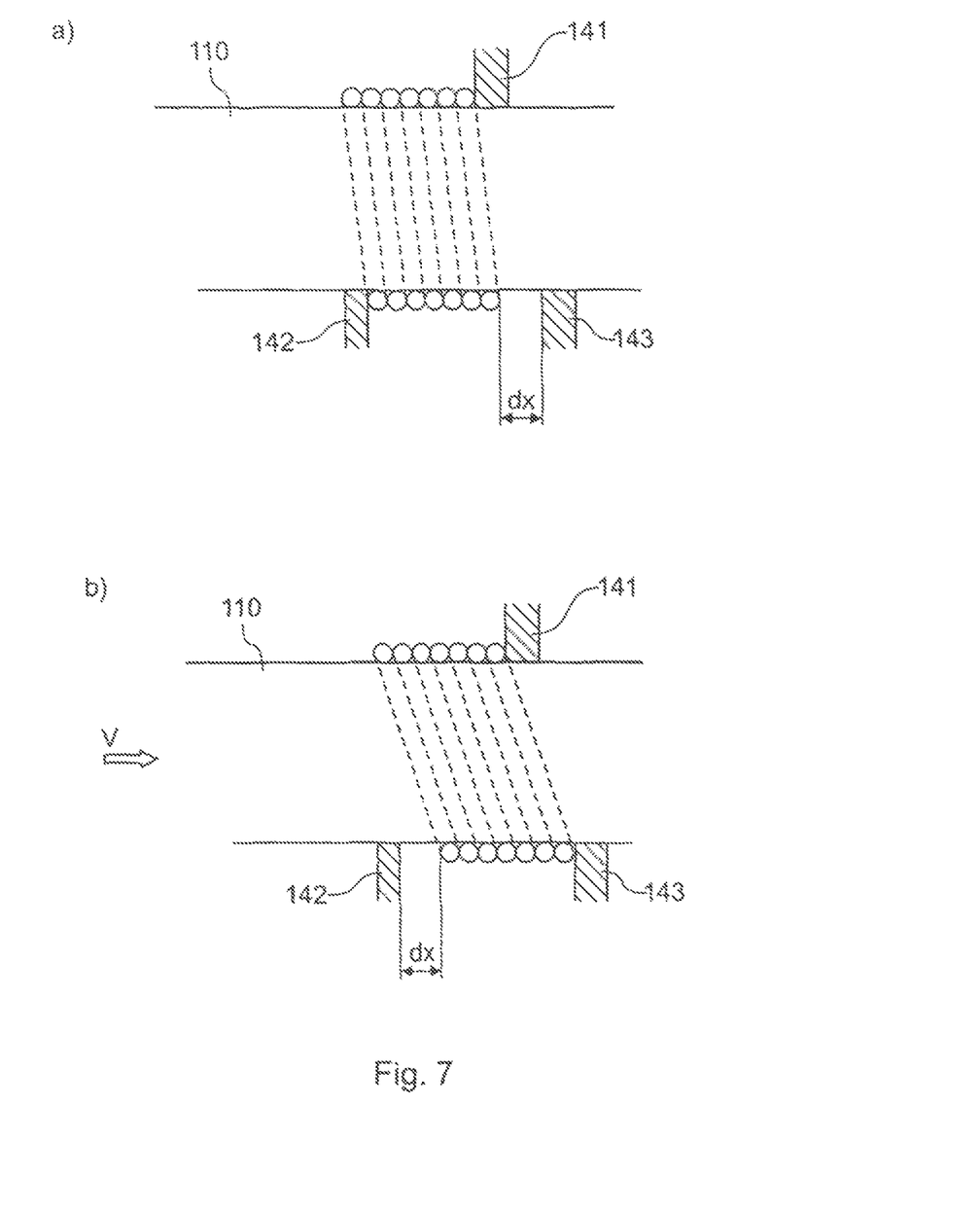
FIG. 7 shows instantaneous illustrations a) and b) to illustrate the operating principle of the clamping device.

As is also illustrated in FIGS. 7a and 7b, under normal circumstances the wrap spring end faces (see also FIGS. 3 and 4) are seated against the alternating stops 141 and 142 under ordinary actuating forces. A certain oblique position of the torsion spring, and consequently a certain preload, can be produced by way of the axial distance of the stops from each other (see FIG. 7a). In the event of a crash, which is to say when a crash force occurs in the direction V, this oblique position is increased, whereby the torsion spring moves away from the stop 142 until ultimately it is seated against the stop 143 and can be displaced relative to the casing tube 110 (or receiving tube 120 in FIG. 2) with a defined oblique position, and thus a defined clamping force level.

Even this deliberately caused deflection causes the clamping force to be reduced, allowing immediate sliding of the steering shaft 110 in the direction V.

So as to precisely adjust the sliding action, a third stop element 143 is provided, which is initially located under normal circumstances at the distance dX from the torsion spring 130. This distance dX can be 0 to 20 mm, for example. In the event of a crash, the deflection of the torsion spring 130 that occurs causes the third stop element 143 to also make contact with the one side of the torsion spring 130 when the displacement V exceeds the distance dX, and the stop element then acts as a limit stop. Because of this limit stop 143, the deflection of the torsion spring 130 is limited or adjusted to a defined angle of inclination. The angle of inclination is substantially defined by the distance dX. Because an angle of inclination is established with such precision, it is also possible to very precisely establish the desired friction action or sliding action, which in turn allows an optimal crash safety function to be implemented.

Figure 4:
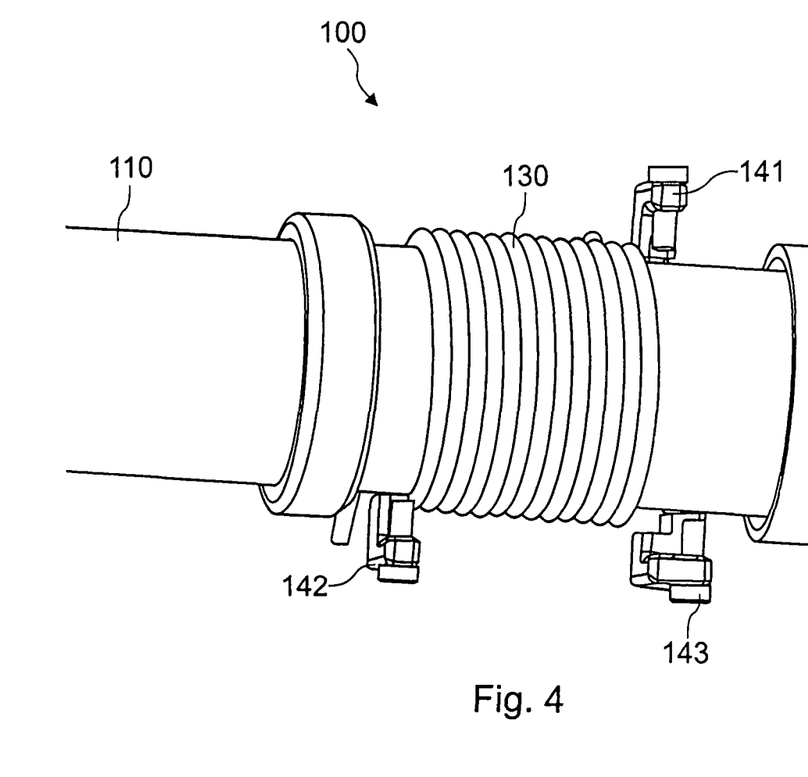
FIG. 4 shows, by way of example, the arrangement of stop elements at or in the vicinity of the torsion spring.

FIG. 4 shows a further view of the torsion spring 130 comprising the previously described stop elements 141, 142 and 143. As is also apparent from FIG. 4, initially only stop elements 141 and 142 are in contact with the torsion spring under normal circumstances. However, in the event of a crash, the torsion spring 130 also makes contact with the limit stop 143, with the stop element 142 ceasing to be engaged, whereby a defined limitation of the deflection is brought about.

Figure 5:
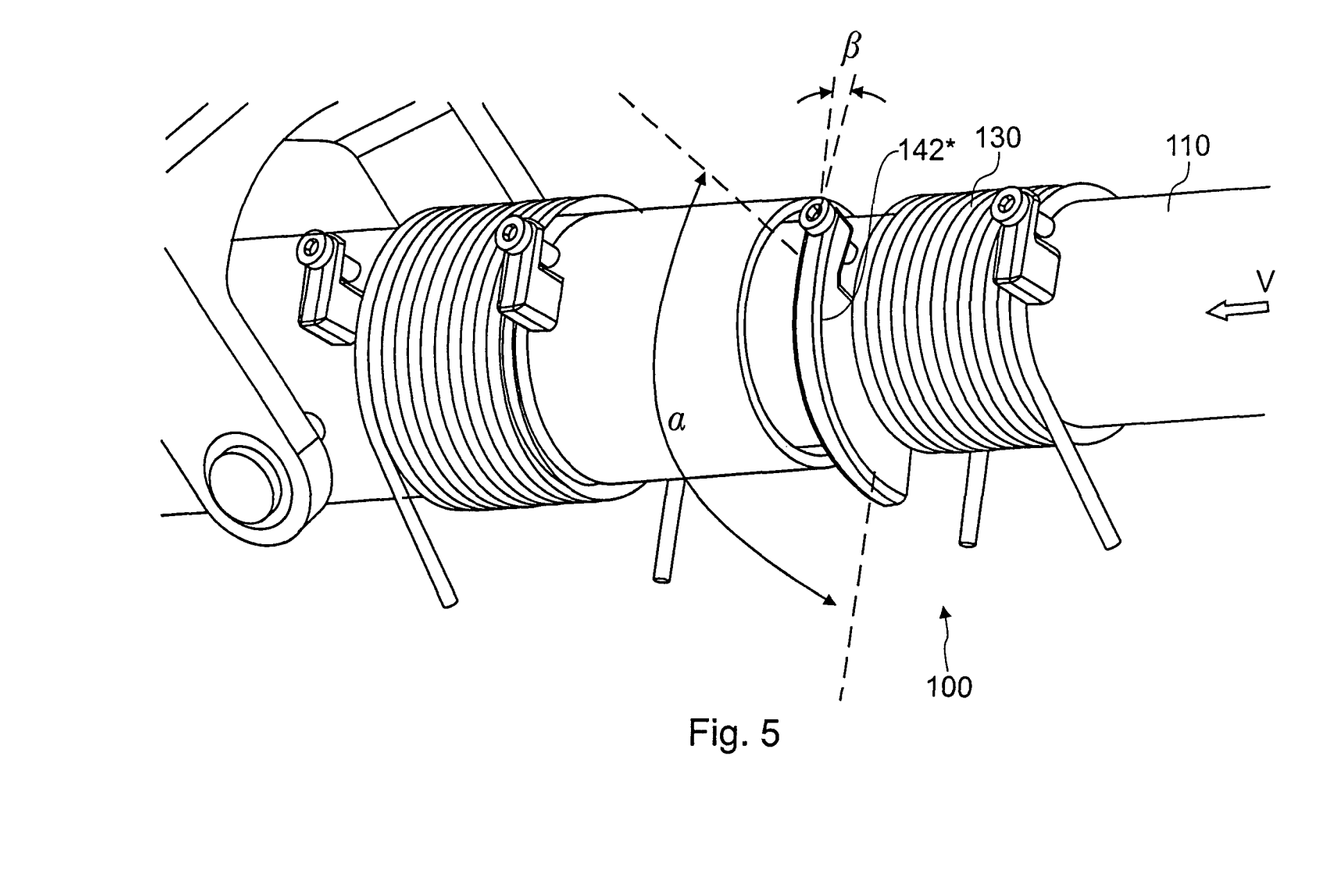
FIG. 5 shows the arrangement of several torsion springs and several stop elements, wherein one stop element is designed as an element extending in the circumferential direction.

FIG. 5 shows a further embodiment, in which one of the stop elements, and more specifically the stop element 142* in this example, is designed as an elongate stop element extending in the circumferential direction. The extension or expansion of this stop element 142* is defined by an angle of circumference α, which is approximately 90°, for example. The size of the stop angle α thus defines the effective length of the stop element 142*, and hence defines the clamping force that occurs. The greater α, the lower the clamping force is. As a result, the design of the stop element 142* can also be used to establish the desired amount of the clamping force. Moreover, the elongate stop element 142* can be mounted at an adjustment angle β, which ultimately defines the desired angle of inclination for the deflection of the torsion spring 130.

Figure 6:
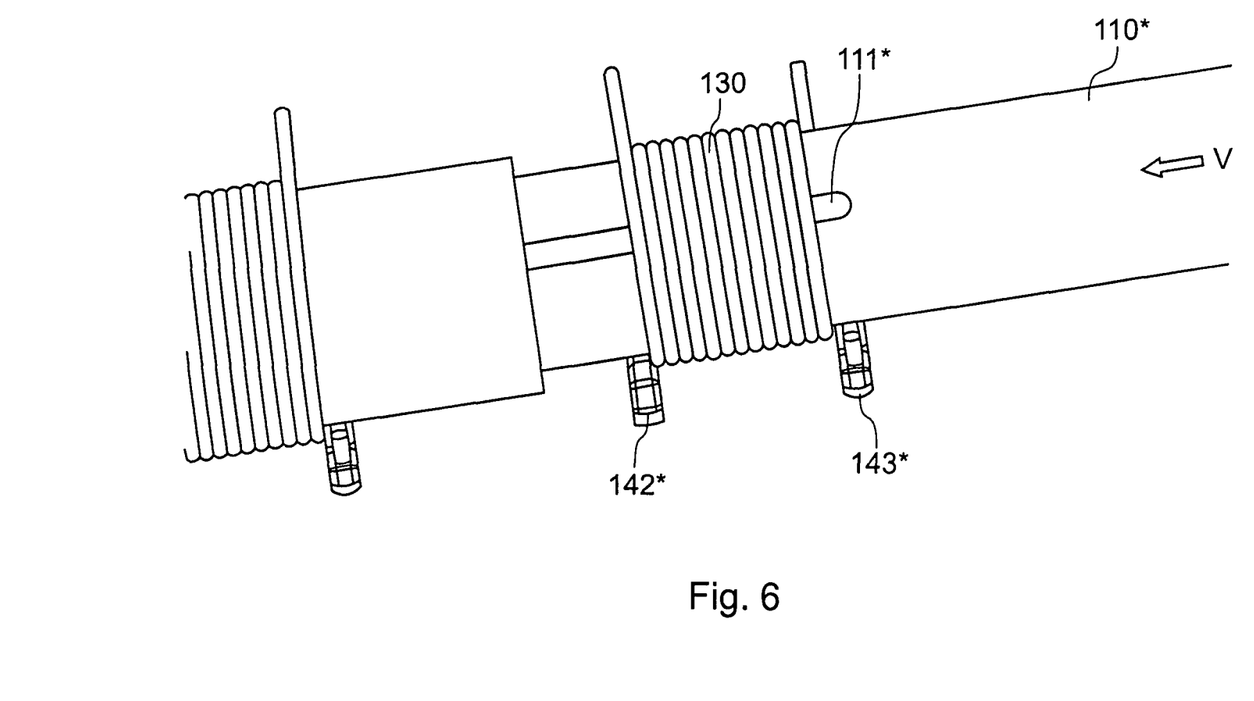
FIG. 6 shows a variant in which the steering column is provided with a longitudinal slot.

FIG. 6 shows a further embodiment, in which the steering column 110* is provided with an opening in the form of a longitudinal slot 111*. Other openings, such as holes, hole patterns and the like, are also conceivable. The opening (which here is a longitudinal slot) causes a defined weakening of the casing tube and thus a reduction of the clamping force in the region of the torsion spring 130. The clamping force can also be adjusted by way of the dimensioning of the slot 111'.

The partial FIGS. 7a and 7b already described above show instantaneous illustrations to illustrate the operating principle of the clamping device. Under normal load, slight deflection of the torsion spring, or a preload, may occur, which is already substantially limited by the stops 141 and 142. In the event of a crash, which is to say with overload, the deflection or oblique position increases considerably and is limited by the limit stop 143.

Because of the invention, in the event of a crash, during compression of the steering column it is possible to achieve a defined limitation of the attendant relative displacement of the torsion spring by means of the at least one stop element, such that the torsion spring, or the windings thereof, assume a slightly oblique or deflected position, and thereby the clamping force prevailing between the torsion spring and steering column is reduced in a defined manner, and hence controlled sliding of the steering column relative to the torsion spring is made possible. This in turn allows the crash energy that occurs to be dissipated in a defined manner. Thus, using only a single component, this being a torsion spring, clamping for locking the steering column is possible while an effective crash safety function is implemented.

Both functions, which is to say the locking of the steering column and the dissipation of crash forces, are thus implemented by the same component, which is to say the torsion spring. The solution according to the invention therefore requires fewer components and less installation space than the solutions known from the prior art. The displaceability of the torsion spring, which is arranged for the longitudinal adjustment of the steering column, is preferably limited by the at least one stop element such that, in the event of a crash, defined deflection of the torsion spring occurs, and thus a controlled dissipation of the crash forces can be achieved.

It is also possible to arrange several torsion springs on the steering column which, in the event of a crash, each strike against at least one stop element and are thus deflected in a defined manner. The at least one stop element is also used in each case to guide the torsion spring in the normal operating state, which is to say with a normal adjustment of the steering column.

A bolt or a pin can, for example, be provided as the stop element. The stop element may also be provided in the form of an element which extends partially in the circumferential direction and is preferably arranged at a defined angle, which in turn defines the maximum allowable angle of deflection or angle of inclination.

The invention claimed is:

1. An adjustable safety steering column for a motor vehicle, comprising at least one clamping device which comprises a torsion spring which clamps a casing tube for a steering shaft at a position that can be adjusted by releasing the torsion spring to fix a length of the adjustable safety steering column, the casing tube being inserted in the clamping device in an insertion direction, wherein at least in a vicinity of one end of the torsion spring, at least two stop elements are arranged, against one of which the torsion spring strikes during an axial displacement (V) of the casing tube occurring in the insertion direction.

2. The adjustable safety steering column according to claim 1, wherein one of the at least two stop elements is a first stop element arranged in a vicinity of a first end of the torsion spring, a further stop element is a second stop element arranged in a vicinity of an opposite, second end of the torsion spring, and another one of the at least two stop elements is a third stop element arranged in the vicinity of the first end of the torsion spring, wherein the first end of the torsion spring strikes against of the first stop element when displacement (V) of the casing tube occurs.

3. The adjustable safety steering column according to claim 2, wherein the second stop element is arranged offset from the first stop element in a circumferential direction.

4. The adjustable safety steering column according to claim 2, wherein the third stop element is arranged at a predeterminable distance (dX) from the first end of the torsion spring, the first end of the torsion spring striking against the third stop element when the displacement (V) of the casing tube reaches or exceeds the predeterminable distance (dX).

5. The adjustable safety steering column according to claim 4, wherein the distance (dX) ranges between 0 and 20 mm.

6. The adjustable safety steering column according to claim 4, wherein the distance (dX) is dependent on at least one spring parameter of the torsion spring.

7. The adjustable safety steering column according to claim 6, wherein the at least one spring parameter of the torsion spring is number of windings, wire diameter, material and/or inside diameter of the coil.

8. An adjustable safety steering column according to claim 4, wherein the first and second stop elements cause a positional fixation of the torsion spring and the third stop element, due to the spaced position thereof, defines the clamping force that develops during the displacement (V) of the casing tube and oblique positioning of the coil of the torsion spring.

9. An adjustable safety steering column according to claim 1, wherein the steering column further comprises a second clamping device for fixing the length or an inclination of the adjustable steering column, wherein the second clamping device comprises a second torsion spring.

10. The adjustable safety steering column according to claim 9, wherein at least in a vicinity of one end of the second torsion spring, at least two stop elements are arranged, against one of which the torsion spring strikes during an axial displacement (V) of the casing tube occurring in the insertion direction.

11. A clamping device for an adjustable safety steering column for a motor vehicle, wherein the clamping device comprises a torsion spring for fixing a length or an inclination of the adjustable steering column, the torsion spring clamping a casing tube for a steering shaft at a position that can be adjusted by releasing the torsion spring, the casing tube being inserted in the clamping device in an insertion direction, wherein at least in a vicinity of one end of the torsion spring, at least two stop elements are arranged, against one of which the torsion spring strikes during an axial displacement (V) of the casing tube occurring in the insertion direction.

* * * * *